A. JOHNSON.
DRAIN PAN.
APPLICATION FILED JAN. 2, 1908.

923,270.

Patented June 1, 1909.

Witnesses
J. M. Fowler Jr.
H. Strauss

Inventor
Albert Johnson
By Julius D. Peyser
Attorney

UNITED STATES PATENT OFFICE.

ALBERT JOHNSON, OF NEW YORK, N. Y.

DRAIN-PAN.

No. 923,270.  Specification of Letters Patent.  Patented June 1, 1909.

Application filed January 2, 1908. Serial No. 408,977.

*To all whom it may concern:*

Be it known that I, ALBERT JOHNSON, a subject of the King of Sweden, residing at New York, in the county of New York and State of New York, have invented certain new and useful Improvements in Drain-Pans, of which the following is a specification.

This invention relates to drain pans, and more particularly to a drain pan having means for preventing an overflow.

The object of my invention is to provide a drain pan for refrigerators, and to so construct the same that it may be easily and quickly connected to a drain pipe, will discharge the waste from the refrigerator, and will not become clogged, thus avoiding an overflow.

With these ends in view, my invention consists in the particular construction of the various parts, and in the novel manner of combination and arrangement of said parts, all of which will be hereinafter more fully described, and specifically pointed out in the appended claims.

Figure 1:
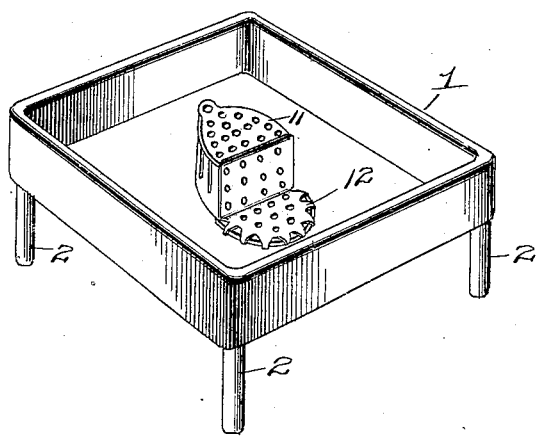
Figure 2:
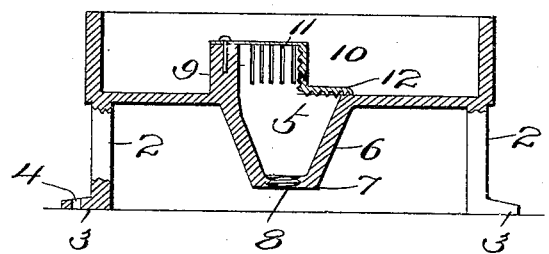

In the drawings forming a part of this specification: Figure 1, is a perspective view, and Fig. 2, is a vertical sectional view.

Referring by numerals to the drawings, 1 represents a pan or receptacle which may be constructed in any desirable shape or form. This pan is supported by four corresponding legs 2, each of which is provided in its foot 3, with an aperture 4, adapted to receive a screw or other means for fastening the pan in position. In the bottom of the pan is a central aperture 5, having a downwardly projecting portion or collar 6, contracted as shown at 7, and internally screw-threaded as at 8, which threads are adapted to engage threads upon a waste pipe not shown. Surrounding a portion of the aperture 5, and projecting upward from the bottom of the pan to a point slightly below the rim is a semi-elliptical comb 9, the wall of which is slotted as shown at 10; these slots may be varied to any desired length. The top and open side of the comb as well as that portion of the aperture 4, not surrounded by the comb, is covered by an angular strainer 11, having a notched flange 12, which engages the bottom of the pan, and means for fastening the same in position.

It will be seen that a drain pan constructed in accordance with my invention will prevent an overflow, for when the lower passages in the strainer become clogged the water will rise and pass through the comb and higher passage ways.

Having thus described the various features of my invention, what I claim as new and desire to secure by Letters Patent is:

1. A drain pipe having an aperture located centrally in its bottom, a downwardly projecting portion surrounding said aperture, said downwardly projecting portion being contracted at the bottom and internally screw-threaded, a semi-elliptical comb surrounding said aperture and projecting upwardly in said pan, a screen covering said aperture and comb, substantially as specified.

2. A drain pan having four corresponding legs, means for securing said legs to a floor, an aperture located centrally in the bottom of the pan, a portion surrounding said aperture and projecting downwardly therefrom, the lower end of the downwardly projecting portion being contracted and provided with internal threads, a semi-elliptical comb surrounding the said aperture and projecting upwardly from the bottom of the pan, said comb being formed with a series of slots, a screen covering the aperture and comb, and means for securing the screen in position, substantially as specified.

ALBERT JOHNSON.

Witnesses:
 THOMAS T. CROTTY,
 JAMES H. HAVENS.

Correction in Letters Patent No. 923,270.

It is hereby certified that in Letters Patent No. 923,270, granted June 1, 1909, upon the application of Albert Johnson, of New York, N. Y., for an improvement in "Drain-Pans," an error appears in the printed specification requiring correction, as follows: In line 63, the word "pipe" should read *pan;* and that the said Letters Patent should be read with this correction therein that the same may conform to the record of the case in the Patent Office.

Signed and sealed this 31st day of August, A. D., 1909.

[SEAL.]

F. A. TENNANT,
*Acting Commissioner of Patents.*